United States Patent
Reeves et al.

(10) Patent No.: US 11,260,305 B2
(45) Date of Patent: Mar. 1, 2022

(54) USER MATCHING BASED ON ACTIVE GAME TIME

(71) Applicant: INTERNATIONAL BUSINESS MACHINES CORPORATION, Armonk, NY (US)

(72) Inventors: Peter Reeves, Newcastle Upon Tyne (GB); Aiden J. Gallagher, York (GB); Sachin Tanna, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/819,371

(22) Filed: Mar. 16, 2020

(65) Prior Publication Data
US 2021/0283510 A1    Sep. 16, 2021

(51) Int. Cl.
| | |
|---|---|
| A63F 13/795 | (2014.01) |
| A63F 13/48 | (2014.01) |
| A63F 13/798 | (2014.01) |
| A63F 13/35 | (2014.01) |

(52) U.S. Cl.
CPC ............ *A63F 13/795* (2014.09); *A63F 13/35* (2014.09); *A63F 13/48* (2014.09); *A63F 13/798* (2014.09); *A63F 2300/556* (2013.01); *A63F 2300/558* (2013.01); *A63F 2300/5566* (2013.01); *A63F 2300/636* (2013.01)

(58) Field of Classification Search
CPC ........................ A63F 13/795; A63F 2300/5566
See application file for complete search history.

(56) References Cited

U.S. PATENT DOCUMENTS

| | | | |
|---|---|---|---|
| 6,042,477 A | 3/2000 | Addink | |
| 2006/0135264 A1* | 6/2006 | Shaw | ...................... A63F 13/35 |
| | | | 463/42 |
| 2012/0283023 A1* | 11/2012 | O'Kelley, II | ....... G07F 17/3276 |
| | | | 463/42 |
| 2012/0302354 A1* | 11/2012 | Thakkar | .................. G06F 3/048 |
| | | | 463/42 |

(Continued)

OTHER PUBLICATIONS

Disclosed Anonymously, "Method and System for Managing and Scheduling Unfinished Multi-Player Online Games based on Availability of Players", IP.com No. IPCOM000221151D, Date: Aug. 30, 2012, pp. 1-3.

(Continued)

*Primary Examiner* — Jay Trent Liddle
(74) *Attorney, Agent, or Firm* — John Noh

(57) ABSTRACT

A method, a computer program product, and a computer system match players in a turn based game based on player activity. The method includes determining first characteristics of a first player activity of a first player. The characteristics are indicative of first active times that the first player historically took turns while playing the turn based game. The method includes identifying a second player having second characteristics of a second player activity. The second characteristics are indicative of second active times that the second player historically took turns while playing the turn based game. The second active times are compatible with the first active times. The method includes generating an indication for a game server hosting the turn based game to match the second player with the first player.

20 Claims, 6 Drawing Sheets

(56) References Cited

U.S. PATENT DOCUMENTS

| | | | |
|---|---|---|---|
| 2013/0165234 A1* | 6/2013 | Hall | A63F 13/00 |
| | | | 463/42 |
| 2013/0254278 A1 | 9/2013 | Buhr | |
| 2014/0274402 A1* | 9/2014 | Michel | A63F 13/30 |
| | | | 463/42 |
| 2016/0184706 A1* | 6/2016 | Muller | A63F 13/35 |
| | | | 463/42 |
| 2016/0199740 A1* | 7/2016 | Hall | A63F 13/00 |
| | | | 463/31 |
| 2016/0279524 A1* | 9/2016 | Shaw | A63F 13/12 |
| 2017/0259178 A1 | 9/2017 | Aghdaie | |
| 2018/0157981 A1* | 6/2018 | Albertson | G06N 3/006 |

OTHER PUBLICATIONS

Mell et al., "The NIST Definition of Cloud Computing", National Institute of Standards and Technology, Special Publication 800-145, Sep. 2011, pp. 1-7.
Schlup, "Automatic Game Matching", https://www.semanticscholar.org/paper/Automatic-Game-Matching-Schl . . . , 2003, pp. 1-15.

* cited by examiner

USER MATCHING BASED ON ACTIVE GAME TIME

BACKGROUND

The exemplary embodiments relate generally to turn based games, and more particularly to matching a first player with a second player to play in a turn based game with one another based on player activity.

An electronic game may be played by one or more players. For multiplayer games, a game server may host the game via a network where a plurality of players may log into the game server to play the game against one another. There may be a variety of ways for players to match with another player to play the game. For example, a first player may specifically identify a second player for which a game is to be played. The second player may accept the game invitation for the game to be played against manually identified players. In another example, a first player may select to play the game and the game server may select a second player for which the game is to be played. The game server may select from a pool of currently available players (e.g., those who have logged into the game server). There are also a variety of types of games that the players may engage. For example, the game server may host a game where each player playing the game performs actions in a concurrent manner (e.g., a real time strategy game). In another example, the game server may host a turn based game where each player playing the game performs actions in turns where a first player performs actions during the first player's turn and a second player performs actions during the second player's turn. This process may repeat where each player takes a turn in a round robin fashion until the game ends. In this manner, a first player takes a turn, waits for a second player to complete a turn, and the first player may then take a following turn (e.g., a starting player takes odd numbered turns and the other player takes even numbered turns).

When two players are matched by the game server for a turn based game, there may be instances with significant time lags due to one of the players taking a substantial amount of time to complete a turn. For example, a first player may complete a first turn and the second player may complete a second turn at a second, later time. However, the first player may perform turns at a relatively slow rate (e.g., only logging into the game server to complete turns during one stretch of time during a day). For example, after completing the first turn, the first player may have logged out of the game server and not log back into the game server to perform the third turn until a much later time. The second player must therefore wait until the first player has completed the third turn before the second player may take the fourth turn. When the second player is more active and performs turns in a relatively faster rate (e.g., staying logged into the game server to perform a turn throughout the day), the second player is forced to wait for the less active first player in each round of turns. This may result in the second player losing interest in the game and may also result in the second player being less inclined to suggest the game to others which may lead to reduction in available players as new players may decrease or existing players may leave.

SUMMARY

The exemplary embodiments disclose a method, a computer program product, and a computer system for matching players in a turn based game based on player activity. The method comprises determining first characteristics of a first player activity of a first player. The characteristics are indicative of first active times that the first player historically took turns while playing the turn based game. The method comprises identifying a second player having second characteristics of a second player activity. The second characteristics are indicative of second active times that the second player historically took turns while playing the turn based game. The second active times are compatible with the first active times. The method comprises generating an indication for a game server hosting the turn based game to match the second player with the first player.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
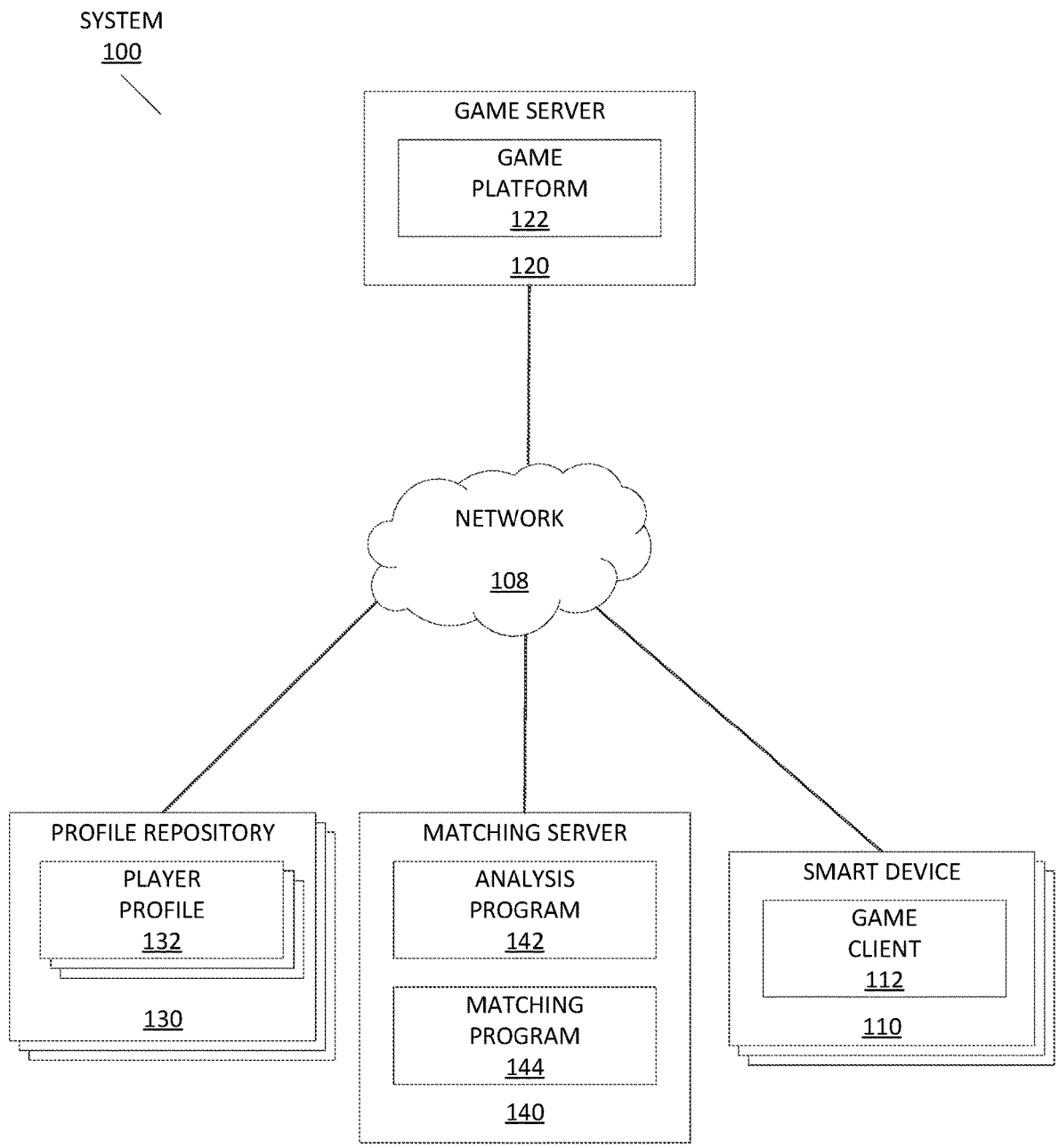
FIG. 1 depicts an exemplary schematic diagram of a gaming system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for matching players in a turn based game based on player activity where players who are matched exhibit similar playing habits. As will be described in greater detail herein, the exemplary embodiments are configured to monitor a player as the player plays the turn based game. In monitoring the player, the exemplary embodiments may track the player activity of the player including when and how often turns are played over a period of time. The exemplary embodiments provide a mechanism to generate a player profile that dynamically updates the player activity for each player. When the exemplary embodiments are to match a first player and a second player to play the turn based game, the exemplary embodiments may utilize the player profiles to minimize time lags experienced by the players where the player activity and/or playing habits complement one another. Key benefits of the exemplary embodiments may include an alternative matching scheme in matching players for a turn based game for the game to proceed with only anticipated time lags based on the compatible player activities of the players. Detailed implementation of the exemplary embodiments follows.

Conventional approaches to matching players for a game may involve a variety of factors but may not incorporate whether two players have complementing or compatible schedules to play the game. Initially, conventional approaches are not directed to matching players in a turn based game but for concurrent play. Accordingly, matching schemes directed toward real time strategy games may not utilize proper considerations to match players in a turn based game. Even if these matching schemes were to be used for turn based games, such conventional approaches may not provide the features that the exemplary embodiments offer. For example, a conventional approach may match players based on characteristics of the players including language preference, availability of space in groups, playing style, etc. However, such a conventional approach does not incorporate activity level in the past or present with particular emphasis on turn based games to ensure turns are taken by both players during times when the players are not actively waiting. In another example, a conventional approach may match players based on a range of attributes such as age and gender. The conventional approach may also provide a wait time to users to find a matching player and may refer to historical data to determine the wait time. However, the historical data does not describe a player activity indicative of when players are actively playing a game, particularly for turn based games. In a further example, a conventional approach may match players based on interactions within a scope of the game to form compatible teams. The conventional approach may also optimize based on a user's interest in the game. However, this conventional approach does not describe matching players based on player activity.

In contrast to conventional approaches, the exemplary embodiments may improve a user experience for players engaged in a turned based game by optimization of player matchmaking by creating a gaming experience whereby all players involved have highly compatible and complementary play-sessions. Those skilled in the art will appreciate that matching players in a turn based game may result in significant time lags, even if the players were to have similar active periods. Having similar active periods does not ensure that the players will play the game or take turns in a manner that allows for more optimized game play. In this manner, the exemplary embodiments match players based on historical data of player activity that is indicative of schedules that the players are expected to follow in being active in the game to take turns.

The exemplary embodiments are described with regard to matching players in a turn based game. However, the use of turn based games is only exemplary. The exemplary embodiments may be utilized and/or modified to match a plurality of users to a common endeavour. For example, a project may require a plurality of participants where the project requires input from multiple users in a round robin manner (e.g., building on the project from previous contributions). The exemplary embodiments may refer to activity levels of a pool of participants to identify which participants would be optimal for inclusion in the project. The exemplary embodiments are also described with regard to the turn based game being played between two players. However, the exemplary embodiments may be modified or extended to apply to turn based games involving more than two players.

FIG. 1 depicts a gaming system 100, in accordance with the exemplary embodiments. According to the exemplary embodiments, the gaming system 100 may include one or more smart devices 110, a game server 120, one or more profile repositories 130, and a matching server 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the gaming system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the gaming system 100 that do not utilize the network 108.

In the exemplary embodiments, the smart device 110 may include a game client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, a console, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the game client 112 may act as a client in a client-server relationship and may be a software, hardware, and/or firmware based application capable of allowing a player to match with another player to play a turn based game via the network 108. In embodiments, the game client 112 may operate as a user interface allowing the player to enter inputs associated with actions taken in the turn based game as well as interact with one or more components of the gaming system 100, and utilize various wired and/or wireless connection protocols for data transmission and exchange associated with matching players in a turn based game, including Bluetooth, 2.4 gHz and 5 gHz Internet, near-field communication, Z-Wave, Zigbee, etc.

The player may utilize the game client 112 to log into the game server 120 and play the turn based game. The player may have an account linked to the game server 120 that identifies the player. For example, the account may include a user name and/or a password. Once logged into the game server 120, the player may perform a plurality of options. For example, the player may create a new game, may continue an ongoing game, may update settings, etc.

The smart device 110 may be equipped with a variety of input devices (e.g., a keyboard, a mouse, a gaming controller, a voice input device, etc.) through which the player may enter inputs for the game to perform corresponding actions. The game client 112 may be implemented in a variety of ways for the player to play the turn based game with another player. For example, the game client 112 may run the turn based game locally with the smart device 110 being a console. Through data exchanged with the game server 120, the player may enter inputs that are reflected in the game and shown in a corresponding manner. The inputs entered by player may be transmitted to the game server 120 to show the same actions on an interface of the game for the other player. The other player may also enter inputs that are reflected in the game of the other player as well as being transmitted to the game server 120 such that the same actions are shown on the interface of the game for the player. In this manner, the turn based game may be run locally on two smart devices 110 for the two players in the game. In another example, the turn based game may be run remotely via the game server 120 such as when the game client 112 is run via a browser. In this manner, inputs entered by players may be transmitted to the game server 120 which processes the inputs and updates the game where corresponding changes to the game are transmitted to the game clients 112 and shown via the interface.

In the exemplary embodiments, the game server 120 may include a game platform 122 and act as a server in a client-server relationship with the game client 112 and may be a software, hardware, and/or firmware based application capable of hosting a turn based game for players to play with one another via the network 108. The game server 120 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the game server 120 is shown as a single device, in other embodiments, the game server 120 may be comprised of a cluster or plurality of computing devices, working together or working independently. While the game server 120 is also shown as a separate component, in other embodiments, the operations and features of the game server 120 may be incorporated with one or more of the other components of the gaming system 100. For example, relative to the perspective of the player and the smart device 110, the turn based game may be hosted remotely on the game server 120 or locally on the smart device 110 via the game client 112. The game server 120 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the game platform 122 may host the turn based game that is played by two players. The turn based game may be any genre of game in which a first one of the players takes a turn by performing one or more actions, then a second one of the players takes a turn by performing one or more actions, and the process repeats until the game ends. For example, the turn based game hosted by the game platform 122 may be a board game (e.g., chess, checkers, Reversi, Go, etc.), a turn based tactical game (e.g., a battle simulator), etc.

The game platform 122 may perform operations such that the turn based game is played between the two players. For example, when the turn based game is hosted by the game platform 122, the game platform 122 may receive inputs from the players, process the inputs, and transmit an update to the game to the game clients 112. In another example, when the turn based game is hosted locally on the smart device 110, the game platform 122 may receive inputs from one of players and transmit an update to be reflected on the other players interface.

The game server 120 may utilize an account repository (not shown) which may be remote or local to the game server 120. The account repository may indicate current players who are playing the game, players available to play the game (e.g., logged into the game server), seeking to start or continue a game, etc. In creating a game, the game server 120 may receive a manual indication from one of the players of an identity of a desired player for which the game is to be played. When the desired player is available, the game server 120 may create the game to be played between the identified players. The game server 120 may also receive a manual indication of a desire to play the game. In such an option, the game server 120 may select a currently available player and create the game to be played between matched players. As will be described in further detail below, when the game server 120 is to select a player to be matched with another player, the game server 120 may receive an indication of an identity of an available player from the matching server 140.

The game server 120 may also store a most recent update to the game while the game is ongoing (e.g., prior to the game ending). Accordingly, the players may continue a game that has started until a conclusion. The game server 120 may be configured to store the most recent update to the game for a predetermined amount of time. For example, a first player may take a turn and wait for the second player to perform a turn. When the first player's turn has ended, the game server 120 may start a timer. If the timer reaches the predetermined amount of time without the second player performing the turn, the game server 120 may award victory to the first player. The predetermined amount of time may be dynamic, particularly in view of the player activity information that the players may exhibit which forms the basis for the matching.

In the exemplary embodiments, the profile repository 130 may include one or more player profiles 132 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 130 is shown as a single device, in other embodiments, the profile repository 130 may be comprised of a cluster or plurality of electronic devices, in a modular manner, etc., working together or working independently. While the profile repository 130 is also shown as a separate component, in other embodiments, the profile repository 130 may be incorporated with one or more of the other components of the gaming system 100. For example, the profile repository 130 may be incorporated in the matching server 140. Thus, access to the profile repository 130 by the matching server 140 may be performed locally. In another example, the player profiles 132 represented in the profile repository 130 may be incorporated in respective ones of the smart device 110 (e.g., each smart device 110 has a profile repository 130 including at least the player profile 132 of the player who is respectively associated). Thus, access to the profile repository 130 and to a specific one of the player profiles 132 may be performed through a transmission from the smart device 110. The profile repository 130 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the player profiles 132 may each be associated with a respective player who plays the turn based game (e.g., has an account with the game server 120). The player profiles 132 may be populated with various types of information that may be used by the matching server 140 to match one player with another player to play the turn based game. Specifically, the player profiles 132 may include information directed toward a player activity. For example, the player profiles 132 may indicate historical playing activity information. The historical playing activity information may include when the player logs into and out of the game server 120, periods during which the player is actively playing one or more games, a number of turns taken during a course of a defined time duration (e.g., during the period the player is active, for a given one or more login sessions, during a set timeframe, over a total number of games, over a total number of abandoned games due to the other player not taking a turn in due time, etc.), a number of games started during a course of a defined time duration, etc. The player profiles 132 may be updated (e.g., by the matching server 140) so that the historical playing activity information is kept up to date. For example, the player profiles 132 may be updated dynamically such that each parameter of the historical playing activity information is updated when a corresponding event has occurred. In another example, the player profiles 132 may be updated at predetermined time intervals (e.g., every set number of hours) or at predetermined event intervals (e.g., every session from login until logout).

In the exemplary embodiments, the matching server 140 may include an analysis program 142 and a matching program 144 and act as a server in a client-server relationship with the game platform 122 as well as be in a communicative relationship with the profile repository 130. The matching server 140 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the matching server 140 is shown as a single device, in other embodiments, the matching server 140 may be comprised of a cluster or plurality of computing devices, working together or working independently. While the matching server 140 is also shown as a separate component, in other embodiments, the operations and features of the matching server 140 may be incorporated with one or more of the other components of the gaming system 100. For example, the operations and features of the matching server 140 may be incorporated in the smart device 110, particularly the smart device 110 of the player requesting another player to play the turn based game. The matching server 140 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the analysis program 142 may be a software, hardware, and/or firmware application configured to monitor activity of players and track player activity to determine characteristics associated with player activity. Accordingly, the analysis program 142 may update the player profiles 132. The analysis program 142 may track when a player has logged into and out of the game server 120. As the time of the log in and log out may be relative (e.g., when the turn based game is available to different regions over multiple time zones), the analysis program 142 may track the times based on a local clock of the matching server 140 to maintain a common standard of time. The analysis program 142 may also maintain an event tracker that tracks each time a corresponding event has occurred. For example, each time that a game is initiated by the player, the analysis program 142 may update a game event tracker. In another example, each time that a player performs a turn, the analysis program 142 may update a turn event tracker. In this manner, the analysis program 142 may update the various types of information that the player profile 132 includes.

The analysis program 142 may also compensate for variance. A player may play the turn based game at generally similar timeframes and perform various events in a substantially similar pattern. However, there may also be times when the player has further opportunities to play the turn based game that may inadvertently affect the player activity information of the player profile 132. For example, the player may generally not play the turn based game during standard work hours (e.g., 9 am to 5 pm) and instead opt to play the game after a dinner timeframe but before a sleep timeframe (e.g., 8 pm to 10 pm). However, during a holiday or for some other reason, the player may play the game during work hours. These outlier figures may be processed by the analysis program 142. For example, the analysis program 142 may update the player profile 132 to exclude these outlier figures. In another example, the analysis program 142 may incorporate various player activity information that also has notes or conditions (e.g., during holidays, during weekends, etc.). The variance may also relate to a larger period of time (e.g., people on shift work change patterns every set period of time such as every two to three weeks, relate to periods of time during the day such as nights, days, afternoons, etc.). Such patterns may be consistent over large periods of time but may appear random over a short period of time. The analysis program 142 may be configured to incorporate variance in these various periods of time.

The analysis program 142 may also process the information of events during a session to compensate for other types of variance. For example, because turns may not be performed at regular times as the actions of the other player may affect how a player takes turns, the analysis program 142 may process the information to reflect turn variance. In this manner, if a player were to normally take 20 turns during a session but a current session only allowed the player to take 15 turns (e.g., the other player(s) did not take turns in a timely manner as anticipated), the analysis program 142 may incorporate a variance due to these other factors.

Through tracking player activity of the player during a session (e.g., from login time to log out time) and incorporating any variance that may be present, the analysis program 142 may update the player profile 132 in a manner that reflects characteristics associated with player activity. Where appropriate, the characteristics may be reflected into metrics or values for comparison purposes (e.g., as used by the matching program 144). For example, the number of turns taken during a game session may be converted into a metric (e.g., total number of turns taken during a game session timeframe, a number of turns taken per period of time, etc.). In another example, the login time and log out time may be converted into a metric (e.g., a clock time may be converted into a military or 24 hour time where 8 pm may be converted to 2000, 3 am may be converted to 0300, 7:30 am may be converted to 0730, 12:47 pm may be converted to 1247, etc.).

In the exemplary embodiments, the matching program 144 may be a software, hardware, and/or firmware application configured to match a first player with a second player to play the turn based game based on the player activity of the players. The matching program 144 may access the player profiles 132 to identify how the first player is to be matched with a second player. For example, the first player may have requested to play the game and for the game server 120 to select an opponent. The matching server 140 may register when this request is received by the game server 120 to perform the operations in matching the first player with the second player.

Using the player profile 132 of the first player, the matching program 144 may identify the characteristics of the player activity of the first player. The matching program 144 may initially identify currently available players so that the first player may play the game immediately without waiting for the second player to become available. In filtering a pool of players to those who are currently available, the matching program 144 may process the currently available players for potential second players to be matched with the first player.

According to an exemplary implementation, the matching program 144 may process the activity level based on information included in the player profiles 132 to identify potential second players to be matched with the first player. For example, the matching program 144 may utilize a wait time basis to identify the second player. The wait time basis may be directed to periods during which the first player has completed a turn and waits for the second player to complete a turn to take a following turn. The matching program 144 may determine the times when the first player generally performs a turn (e.g., 0800, 0930, 1530, 2200, etc.). The matching program 144 may determine that a potential second player will take turns in between these times that the first player completes turns (e.g., between 0815 to 0925, between 0945 to 1525, between 1545 to 2155, between 2215 to 0755, etc.). Accordingly, in a first characteristic consideration, the matching program 144 may utilize times when turns are taken to determine a potential second player match for the first player. In this manner, the matching program 144 may apply a filter for a compatibility of the first player requesting a new game with a second player who falls within the first player's typical wait times.

The matching program 144 may also incorporate further considerations. For example, each potential second player may not require an exact correspondence to or fall within the first player's wait times. In view of this, the matching program 144 may consider information related to a particular player's number of turns taken to provide further insight as to whether to match a second player with a first player. Accordingly, the number of turns taken at the various times may be determined for the first player (e.g., at 0800 takes four turns, at 0930 takes two turns, at 1530 takes three turns, at 2200 takes four turns, etc.). In such a scenario, the first player may have a plurality of active games for which turns are taken in each time (e.g., the first player is playing in two games where the first player takes turns at 0800, 0930, 1530, and 2200 as well as a third game where the first player takes turns at 0800, 1530, and 2200). Based on this turns taken information, the matching program 144 identify a potential second player as one who takes turns before selected turns of the first player (e.g., before the 0800 turn, before the 2200 turn, etc.).

In another example of further considerations, the matching program 144 may incorporate information directed toward a duration of time and a number of turns taken within an active period. For example, by further incorporating these types of information, the matching program 144 may match the first player with a second player who have compatible active times and take turns during a common time frame.

In a further example of further considerations, the matching program 144 may incorporate account patterns of variance in turns taken over a course of a predetermined time period (e.g., a week). For example, the first player may take turns in the evenings on days that the first player works and during the daytime on days off. These time frames may be normalized based on the internal clock of the matching server 140. If another player has the same pattern and turn schedule (e.g., whether in the same time zone or not through normalization), the matching program 144 may identify such a player as a second player to be matched with the first player.

The matching program 144 may utilize any one or more of the above characteristic comparisons in identifying one or more second players that may be matched with the first player. When comparing the characteristics of player activity between two players, the matching program 144 may determine a difference threshold for metrics corresponding to the characteristics. For example, for each characteristic and the corresponding metric values, the matching program 144 may utilize a respective difference threshold. Thus, for the turns taken over a period of time, the matching program 144 may utilize a turns taken difference threshold to determine whether this characteristic is compatible between the two players (e.g., the metric may indicate a compatibility in active times where a larger difference indicates less overlap in active time while a smaller difference indicates a greater overlap in active time). For the wait time intervals, the matching program 144 may utilize a wait time difference threshold to determine whether this characteristic is compatible between the two players (e.g., the times that the second player takes turns falls within the wait time range of the first player would have a zero wait time difference while the times that the second player takes turns falls outside the wait time range of the first player would have a positive wait time difference). In the exemplary characteristics described above, the matching program 144 may determine when the respective difference threshold is met when the difference of the metrics of the two players is less than the difference threshold. However, those skilled in the art will appreciate that based on the characteristic and the manner with which a corresponding metric is determined, the matching program 144 may determine when the respective difference is met when the difference of the metrics of the two players is at least the difference threshold. Rather than respective determinations, the matching program 144 may also utilize an aggregate difference threshold based on an aggregation of the metrics identified for the various characteristics.

If each player in the pool of currently available players do not satisfy the threshold to match with the first player, the matching program 144 may perform a predictive operation to identify the second player. The matching program 144 may identify players who are currently unavailable but who have player activity as indicated in the respective player profiles 132 that the player is expected to be available and/or active within an acceptable time frame to be matched with the first player. In this manner, the matching program 144 may utilize the information indicating the active time periods of the potential second players in identifying currently unavailable players who may still be a compatible match to the first player. When the predictive operation is used, the matching program 144 may include an indication where the first player who is currently available is defaulted the first turn to minimize any wait time.

In the process of identifying potential second players, the matching program 144 may identify more than one potential second player where each of these potential second players satisfies the difference threshold. When multiple second players are identified for the first player, the matching program 144 may compare the differences of the metrics for the characteristics between the first player and each of the potential second players. The matching program 144 may order the potential second players according to a degree in satisfying the difference threshold. For example, when the metric of a characteristic satisfies the difference threshold from being less than the difference threshold, the matching program 144 may determine that a second player having the smallest difference is the most compatible with regard to this characteristic. In another example, when the metric of a characteristic satisfies the difference threshold from being at least the difference threshold, the matching program 144 may determine that a second player having the greatest difference is the most compatible with regard to this characteristic. Through this comparison within the potential second players who satisfied the initial determination, the matching program 144 may filter these second players to identify an optimal second player to match with the first player from among the potential second players.

Figure 2:
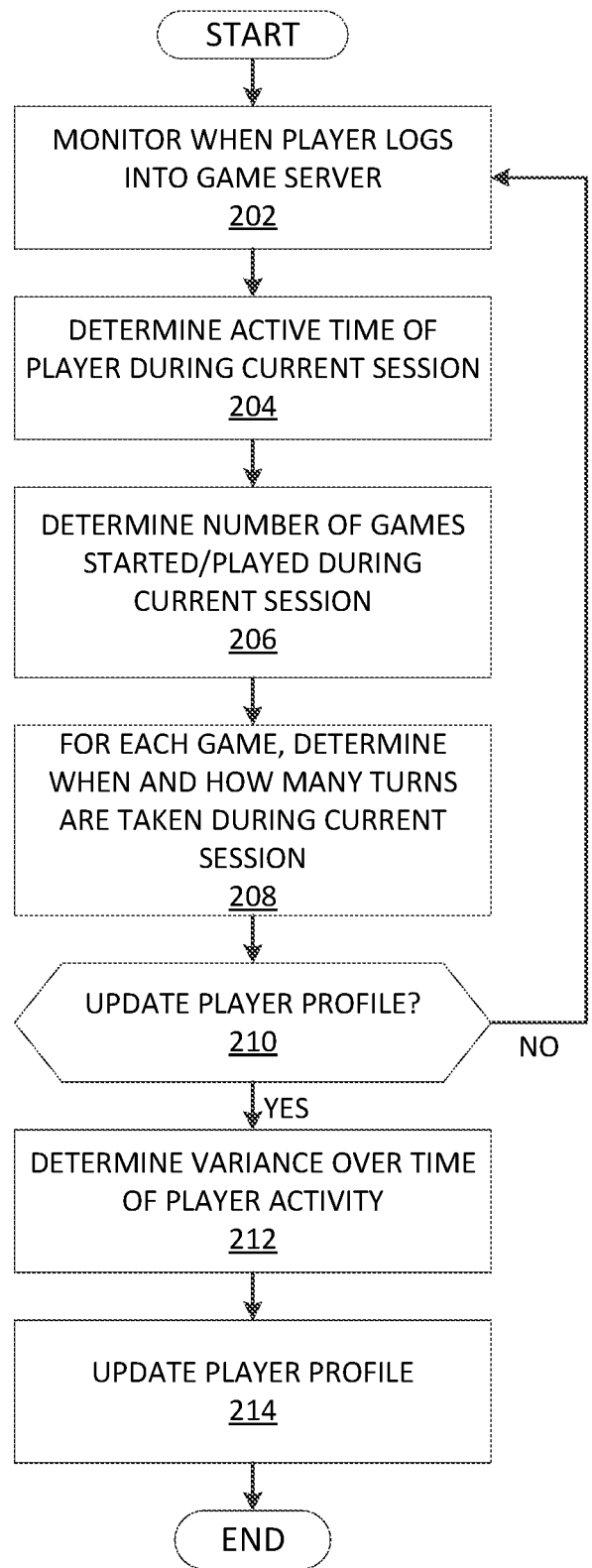
FIG. 2 depicts an exemplary flowchart of a method illustrating the operations of an analysis program 142 of the matching server 140 of the gaming system 100 in generating player profiles used to match players in a turn based game based on player activity, in accordance with the exemplary embodiments.

FIG. 2 illustrates an exemplary flowchart of a method 200 illustrating the operations of the analysis program 142 of the matching server 140 of the gaming system 100 in generating player profiles 132 used to match players in a turn based game based on player activity, in accordance with the exemplary embodiments. The method 300 will be described from the perspective of the matching server 140.

The matching server 140 may monitor when a player logs into the game server 120 (step 202). In updating the player profiles 132, the matching server 140 may determine when a player logs into the game server 120 and logs out of the game server 120. Thus, the time from the login time to the log out time may indicate a game session in which the user may take turns. The matching server 140 may utilize each game session as a unit in which to monitor the various events that may occur including turns taken, active periods, etc. as will be described in further detail below.

To further illustrate the operations of the matching server 140, reference is now made to an illustrative exemplary embodiment. According to the illustrative exemplary embodiment, the matching server 140 may determine when players have game sessions over a course of a day. For example, a first player may initiate a first game session by logging in at 7:45 am and conclude the game session by logging out at 10:00 am according to an internal clock of the matching server 140. The first player may then have a second game session by logging in at 12:00 pm and logging out at 1:00 pm according to the internal clock of the matching server 140. The first player may subsequently have a third game session by logging in at 9:45 pm and logging out at 10:30 pm according to the internal clock of the matching server 140. In this manner, the matching server 140 may monitor each game session from login time to log out time.

The matching server 140 may determine an active time of the user during each game session (step 204). Although the player may be logged into the game server 120, the player may have periods of idleness for a variety of reasons. Accordingly, the matching server 140 may determine periods of activity during each game session. For example, the periods of activity may include times when the player is actively taking a turn.

The matching server 140 may determine a number of games that are started or played during each game session (step 206). As described above, the matching server 140 may incorporate various factors including a number of games that the player is currently a part. The number of games may clarify how each game session may be spent by the player. For example, the player may take a turn in each game session throughout the day for a first game. In another example, the player may take a turn in only select game sessions throughout the day for a second game. In this manner, the matching server 140 may determine how the player is active over a course of one or more games that the player may be a part.

The matching server 140 may determine when and how many turns are taken by the player in each game session (step 208). In monitoring each turn that is taken, the matching server 140 may determine a player activity in a more granular level. Accordingly, the matching server 140 may identify periods of activity related specifically to taking turns which may translate to a variety of other types of information (e.g., wait times between successive turns, a period in which a second player may respond, etc.).

According to the previously introduced exemplary embodiment, the player may have an active time during each game session. For example, in the first game session, the player may have an active time at 8:00 am and 9:30 am; in the second game session, the player may have an active time at 3:30 pm; in the third game session, the player may have an active time at 10:00 pm. Within each active time, the first player may be a part of three different games in which the first player takes turns in each active time of each game session for a first game and a second game but only takes turns in select active times of each game session for a third game (e.g., does not take a turn at 9:30 am for the third game). In view of the game sessions and active times, the matching server 140 may also identify wait times. For example, between the first and second game sessions, a wait time may be from 8:15 am to 9:25 am; between the second and third game sessions, a wait time may be from 9:45 am to 3:25 pm; between the third and fourth game sessions, a wait time may be from 3:45 pm to 9:55 pm; and between the fourth game session and the first game session on a following day (where applicable), the wait time may be from 10:15 pm to 7:55 am.

The matching server 140 may determine whether to update the player profile 132 for the player (decision 210). The matching server 140 may be configured to update the player profile 132 at a variety of times. For example, the matching server 140 may dynamically update the player profile 132 while the matching server 140 monitors the player activity in each game session. In another example, the matching server 140 may update the player profile 132 at predetermined time intervals. In a further example, the matching server 140 may update the player profile 132 when an event is registered (e.g., a turn is taken). In yet another example, the matching server 140 may update the player profile 132 when sufficient data has been gathered to warrant an update. Those skilled in the art will appreciate that the matching server 140 may update the player profile 132 using these, a combination thereof or other conditions.

As a result of the player profile 132 not being updated yet (decision 210, "NO" branch), the matching server 140 continues to monitor the player activity of the player. As a result of the player profile 132 being determined to update (decision 210, "YES" branch), the matching server 140 may perform a further operation in determining variance over time of the player activity (step 212). As described above, there may be characteristics that require variance to be incorporated to provide a more accurate representation of the player activity of the player. For example, a player may take turns at night during weekdays but additionally takes turns during the day on weekends. Accordingly, the matching server 140 may separate the active times during weekends from a player activity information during weekdays. The matching server 140 may perform such variance incorporations for a variety of factors such as outliers (e.g., events that occur randomly or with relatively low frequency), holidays (e.g., exceptions to generally observed behavior in the player activity), etc. The matching server 140 may then update the player profile 132 (step 214).

With reference again to the previously introduced exemplary embodiment, the above noted active times may refer to select days of the week such as weekdays. The player may have increased active times during the weekends. For example, the player may remain logged into the game server 120 from a time the player wakes up to a time the player goes to sleep. In this manner, the game session on weekends may be an extended period of time with active times interspersed therein. The matching server 140 may identify such variances and incorporate the information into an update of the player profile 132. For example, the matching server 140 may set aside such information to be included in a separate indication of active times with a modifier (e.g., day of the week) or remove outlier information having a frequency that falls below a frequency threshold.

Figure 3:
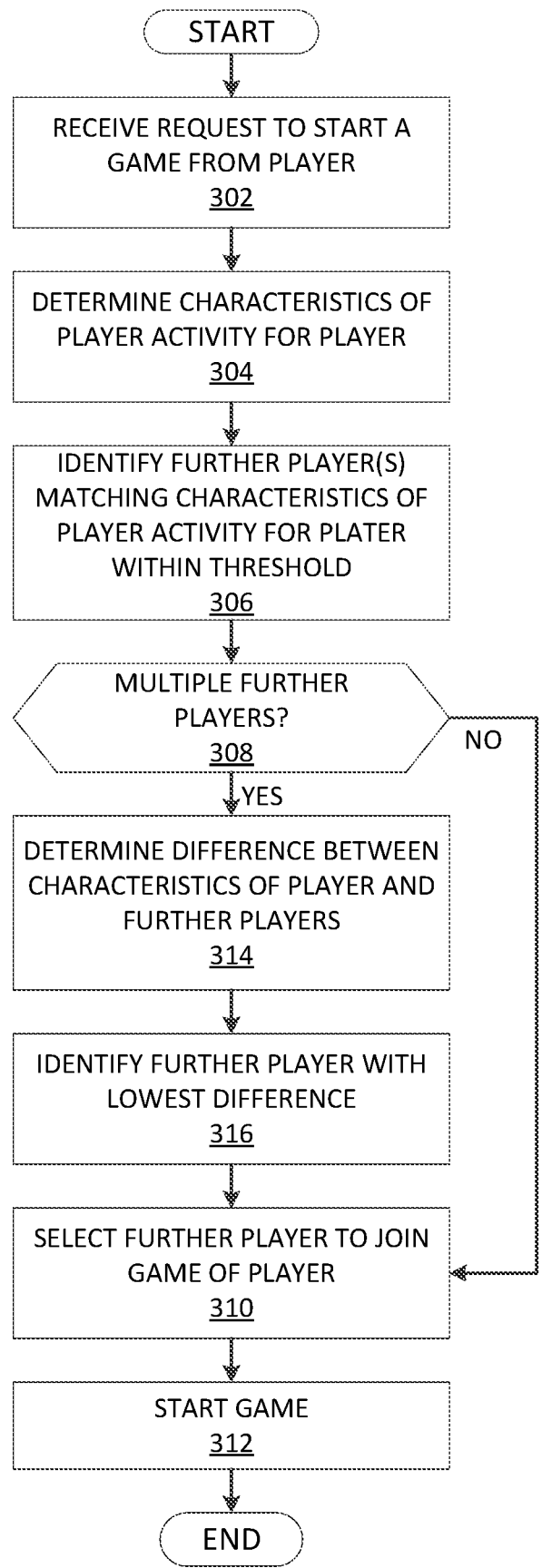
FIG. 3 depicts an exemplary flowchart of a method illustrating the operations of a matching program 144 of the matching server 140 of the gaming system 100 in matching players in a turn based game based on player activity, in accordance with the exemplary embodiments.

FIG. 3 depicts an exemplary flowchart of a method 300 illustrating the operations of a matching program 144 of the matching server 140 of the gaming system 100 in matching players in a turn based game based on player activity, in accordance with the exemplary embodiments. The method 300 will be described from the perspective of the matching server 140.

The matching server 140 may determine when the game server 120 receives a request from a first player to start a game in which the game server 120 selects a second player to match with the first player (step 302). The matching server 140 may be in a communicative relationship with the game server 120. The communicative relationship may be used for the game server 120 to provide an indication to the matching server 140 that the request has been received from the first player. The indication may include an identity of the first player. As will be described in detail below, the communicative relationship may also be used to transmit a recommendation or instruction from the matching server 140 to the game server 120 as to a second player to be matched with the first player who requested the new game.

To further illustrate the operations of the matching server 140, reference is now made to an illustrative exemplary embodiment. According to the illustrative exemplary embodiment, the first player may log into the game server 120. Upon logging in, the first player may enter an input indicating that the first player is requesting to be matched by the game server 120 to play the game. Upon receiving the request from the first player (e.g., via the game client 112 on the smart device 110 associated with the first player), the game server 120 may transmit an indication to the matching server 140 that the request was received. The game server 120 may include an identity of the first player in the indication. The identity may correspond to an identity associated with one of the player profiles 132 stored in the profile repository 130.

The matching server 140 may determine characteristics related to player activity of the first player (step 304). Based on the identity included in the indication from the gaming server 120, the matching server 140 may retrieve the player profile 132 associated with the first player. As described above, the player profile 132 may include various types of information that may be used to determine a plurality of characteristics related to player activity. For example, the player profile 132 may indicate login and log out times for game sessions, an active time, a number of turns taken at various timeframes, a number of games started/played, variance information, etc. For the different characteristics, the matching server 140 may determine corresponding metrics or values that represent the characteristic of player activity for the first player.

According to the previously introduced exemplary embodiment, the matching server 140 may retrieve the player activity information included in the player profile 132 for the first player. The player profile 132 for the first player may indicate various active times or times when the first player generally takes turns. For example, the player may take turns at 8:00 am, 9:30 am, 3:30 pm, and 10:00 pm. Based on this information, the matching server 140 may determine a characteristic of wait times that are available for the first player. From the perspective of the second player who is to be matched to the first player, the wait times may correspond to an active timeframe that falls within the wait times of the first player. Thus, the matching server 140 may determine the wait times of the first player or the active timeframe of the potential second player to be between 8:15 am and 9:25 am, between 9:45 am and 3:25 pm, between 3:45 pm and 9:55 pm, and between 10:15 pm and 7:55 am.

The matching server 140 may identify potential second players that match or is compatible with the characteristics of the player activity of the first player within a difference threshold for the characteristics (step 306). The matching server 140 may identify a pool of players (e.g., utilizing any player profile 132 stored in the player repository 130). In a particular implementation, the matching server 140 may identify a pool of currently available players. Using the pool of players, the matching server 140 may determine which of the players has player activity characteristics that are compatible with the player activity characteristics of the first player. For example, the matching server 140 may determine metrics or values for the characteristics for comparison with the metrics or values of the first player. The matching server 140 may determine a difference in these metrics. The difference may be compared to a difference threshold to determine whether the difference threshold is satisfied. For example, when the characteristic is to be similar, the difference threshold may be set to a near zero value. Thus, the difference threshold may be satisfied when the difference is less than the difference threshold. For players who satisfy the difference threshold, the matching server 140 may classify these players as potential second players to be matched with the first player in which a selection from the potential second players becomes an actual second player to be matched.

The matching server 140 may determine whether the results of identifying the potential second players includes one or more players (decision 308). As a result of the matching server 140 identifying only one potential second player (decision 308, "NO" branch), the matching server 140 may continue with matching the single potential second player with the first player, thereby establishing the potential second player as the actual second player (step 310). The matching server 140 may generate a recommendation or an instruction that is provided to the game server 120 so that the actual second player is matched with the first player. Thereafter, the game between the first and second players may begin (step 312).

As a result of the matching server 140 identifying a plurality of potential second players (decision 308, "YES" branch), the matching server 140 may perform subsequent operations to determine which of the potential second players has a highest compatibility with the first player. In performing these subsequent operations, the matching server 140 may determine the differences in the metrics or values for the characteristics between the first player and each of the potential second players (step 314). As each of the potential second players satisfy the condition of the difference threshold, the degree by which the difference between the first player and each of the potential second players may identify the most compatible candidate among the potential second players to be the actual second player. For example, when the difference is to be a minimum (e.g., near zero), the potential second player having the lowest difference in the metric for the characteristic may be selected as the actual second player. In this manner, the matching server 140 may select this potential second player as the actual second player from among the plurality of potential second players (step 310). The matching server 140 may generate a recommendation or an instruction that is provided to the game server 120 so that the actual second player is matched with the first player. Thereafter, the game between the first and second players may begin (step 312).

With reference again to the previously introduced exemplary embodiment, the matching server 140 may have identified three potential second players. Specifically, the three potential second players may have active times that are within a difference threshold of the wait times of the first player. For example, the matching server 140 may set a difference threshold for the active time of the potential second player to be within 15 minutes of the wait time range of the first player. Thus, by incorporating the difference threshold to a maximum amount, the matching server 140 may select players having active times that are between 8:00 am and 9:40 am, between 9:30 am and 3:40 pm, between 3:30 pm and 10:10 pm, and between 10:00 pm and 8:10 am. The matching server 140 may convert the wait times including the difference threshold as metrics such as 0800 to 0940, 0930 to 1540, 1530 to 2210, and 2200 to 0810. In determining a difference, the matching server 140 may use a center time in each wait time. For example, the center time between 8:15 am and 9:25 am may be 8:40 am (e.g., with a converted metric of 0840), between 9:45 am and 3:25 pm may be 12:35 pm (e.g., with a converted metric of 1235), between 3:45 pm and 9:55 pm may be 6:50 pm (e.g., with a converted metric of 1850), and between 10:15 pm and 7:55 am may be 3:05 am (e.g., with a converted metric of 0305). The matching server 140 may determine a difference between active times of each potential second player with the center times of the wait times of the first player. In determining these differences, the matching server 140 may rank the difference in an individual capacity or as an aggregate (e.g., a sum of all the differences for each wait time). In the example, the matching server 140 may determine that a first potential second player has the smallest difference, a second potential second player has a middle difference, and a third potential second player has a highest difference. For the characteristic of wait times of the first player and active times of the second player, the matching server 140 may utilize a smallest difference standard such that a smallest difference indicates a highest compatibility while a greater difference indicates a lowest compatibility. The matching server 140 may rank the potential second players with the first potential second player having the highest rank and the third potential second player having the lowest rank. By selecting the potential second player with the highest rank, the matching server 140 may select the first potential second player to be matched with the first player. The matching server 140 may generate an instruction for the game server 120 for this match.

The method 300 may incorporate further features of the exemplary embodiments. For example, the method 300 may perform an operation to determine whether the currently available players satisfy the difference threshold. For scenarios where the currently available players are not compatible with the first player, the method 300 may include operations to predictively select a second player for the first player based on player activity and an expectation that the second player is compatible once available.

The exemplary embodiments are configured to match players in a turn based game based on player activity. The exemplary embodiments may monitor player activity while a player is playing the turn based game, particularly during game sessions while the player is logged into a game server that hosts the turn based game. The exemplary embodiments may maintain player profiles of each player that represents the historical player activity. Using the player profiles, when a request is received for a new game to be started including a first player, the exemplary embodiments may determine the characteristics of the player activity of the first player and compare the characteristics with corresponding characteristics of other players. The results of the comparison may be used to identify a second player to be matched with the first player for the game to be played therebetween.

Figure 4:
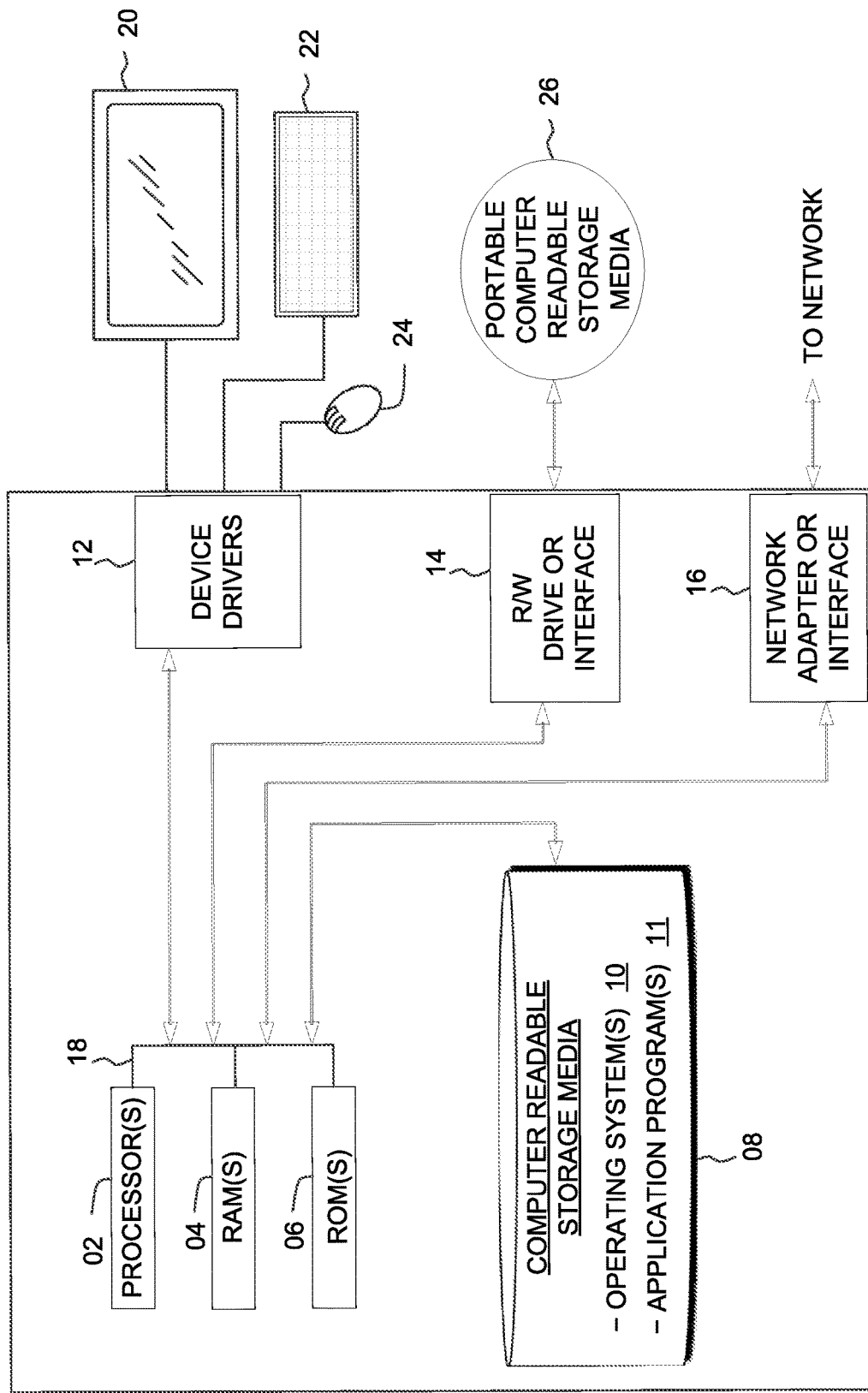
FIG. 4 depicts an exemplary block diagram depicting the hardware components of the gaming system 100 of FIG. 1, in accordance with the exemplary embodiments.

FIG. 4 depicts a block diagram of devices within the gaming system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
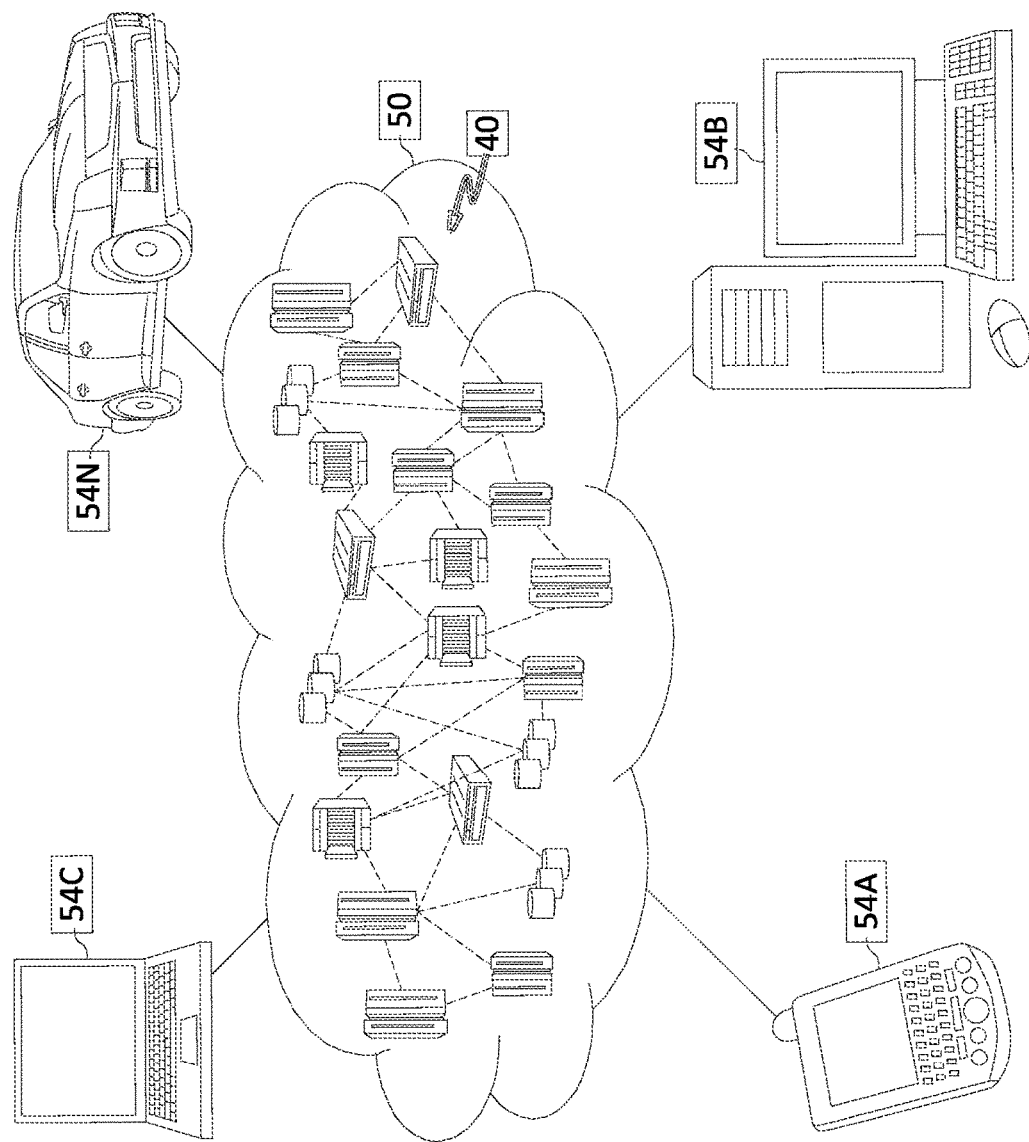
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
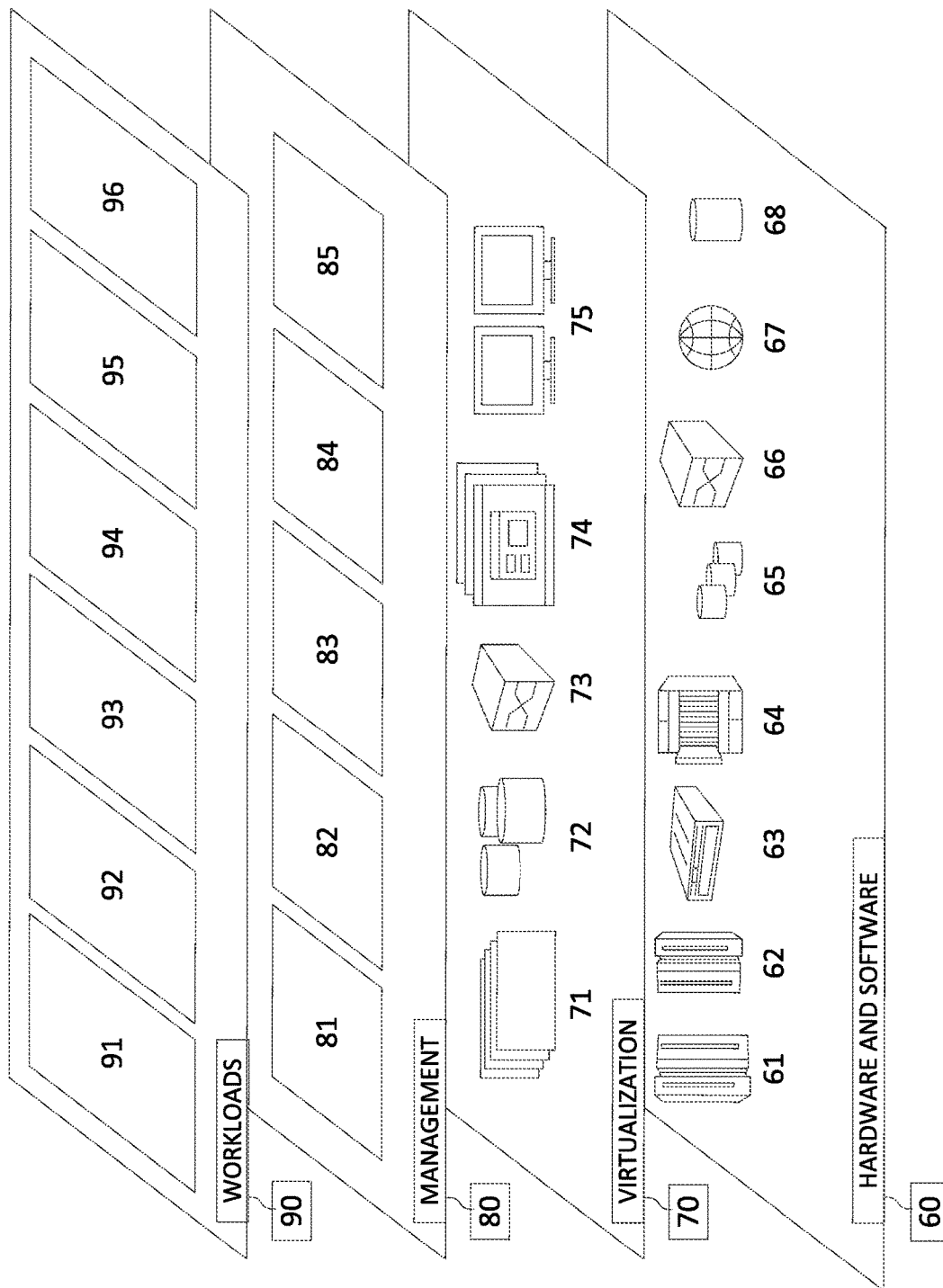
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and matching processing 96.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for matching players in a turn based game based on player activity, the method comprising:
   determining first player characteristics of a first player activity of a first player, the first player characteristics being indicative of first player active times that the first player historically took turns while playing the turn based game, first player login times that the first player historically logged into the turn based game, first player turns taken that the first player historically took during first player historical sessions, and first player games started that the first player historically began during the first player historical sessions, the first player characteristics establishing a first player pattern and a first variance in the first player pattern including first outlier figures of at least one of the first player active times, the first player login times, the first player turns taken, and the first player games started, the first outlier figures being associated with respective timing conditions;

identifying a second player having second player characteristics of a second player activity, the second player characteristics being indicative of second player active times that the second player historically took turns while playing the turn based game, second player login times that the second player historically logged into the turn based game, second player turns taken that the second player historically took during second player historical sessions, and second player games started that the second player historically began during the second player historical sessions, the second player characteristics being compatible with the first player characteristics where at least one of the second player active times, the second player login times, the second player turns, and the second player games started substantially matches a corresponding one of the first outlier figures of the first player characteristics; and generating an indication for a game server hosting the turn based game to match the second player with the first player.

2. The computer-implemented method of claim 1, further comprising:

determining when the game server receives a request from the first player to initiate a new turn based game, the request indicating the game server is to match the first player with the second player; and identifying the first player based on the request from the first player.

3. The computer-implemented method of claim 1, wherein the first player characteristics of the first player activity of the first player and the second player characteristics of the second player activity of the second player are determined from respective information included in a first player profile associated with the first player and a second player profile associated with the second player, respectively.

4. The computer-implemented method of claim 3, further comprising:

monitoring the first player and the second player while playing the turn based game;

identifying activity events during a timeframe when the first and second players are playing the turn based game; and recording the activity events in the first and second player profiles, respectively.

5. The computer-implemented method of claim 4, further comprising:

normalize the first and second active times of the first and second players, respectively, based on the activity events.

6. The computer-implemented method of claim 4, wherein the activity events include a login time, a log out time, an active time period, a number of turns taken, a number of games started, a number of games played, a number of games completed, a number of games abandoned, a number of games abandoned due to time out, or a combination thereof.

7. The computer-implemented method of claim 1, wherein the first active times of the first player form a basis of determining wait times between the first active times of the first player, and wherein the second active times of the second player are within a difference threshold of the wait times of the first player.

8. A computer program product for matching players in a turn based game based on player activity, the computer program product comprising:

one or more non-transitory computer-readable storage media and program instructions stored on the one or more non-transitory computer-readable storage media capable of performing a method, the method comprising:

determining first player characteristics of a first player activity of a first player, the first player characteristics being indicative of first player active times that the first player historically took turns while playing the turn based game, first player login times that the first player historically logged into the turn based game, first player turns taken that the first player historically took during first player historical sessions, and first player games started that the first player historically began during the first player historical sessions, the first player characteristics establishing a first player pattern and a first variance in the first player pattern including first outlier figures of at least one of the first player active times, the first player login times, the first player turns taken, and the first player games started, the first outlier figures being associated with respective timing conditions;

identifying a second player having second player characteristics of a second player activity, the second player characteristics being indicative of second player active times that the second player historically took turns while playing the turn based game, second player login times that the second player historically logged into the turn based game, second player turns taken that the second player historically took during second player historical sessions, and second player games started that the second player historically began during the second player historical sessions, the second player characteristics being compatible with the first player characteristics where at least one of the second player active times, the second player login times, the second player turns, and the second player games started substantially matches a corresponding one of the first outlier figures of the first player characteristics; and generating an indication for a game server hosting the turn based game to match the second player with the first player.

9. The computer program product of claim 8, wherein the method further comprises:

determining when the game server receives a request from the first player to initiate a new turn based game, the request indicating the game server is to match the first player with the second player; and identifying the first player based on the request from the first player.

10. The computer program product of claim 8, wherein the first player characteristics of the first player activity of the first player and the second player characteristics of the second player activity of the second player are determined from respective information included in a first player profile associated with the first player and a second player profile associated with the second player, respectively.

11. The computer program product of claim 10, wherein the method further comprises:
monitoring the first player and the second player while playing the turn based game;
identifying activity events during a timeframe when the first and second players are playing the turn based game; and
recording the activity events in the first and second player profiles, respectively.

12. The computer program product of claim 11, wherein the method further comprises:
normalize the first and second active times of the first and second players, respectively, based on the activity events.

13. The computer program product of claim 11, wherein the activity events include a login time, a log out time, an active time period, a number of turns taken, a number of games started, a number of games played, a number of games completed, a number of games abandoned, a number of games abandoned due to time out, or a combination thereof.

14. The computer program product of claim 8, wherein the first active times of the first player form a basis of determining wait times between the first active times of the first player, and wherein the second active times of the second player are within a difference threshold of the wait times of the first player.

15. A computer system for matching players in a turn based game based on player activity, the computer system comprising:
one or more computer processors, one or more computer-readable storage media, and program instructions stored on the one or more of the computer-readable storage media for execution by at least one of the one or more processors capable of performing a method, the method comprising:
determining first player characteristics of a first player activity of a first player, the first player characteristics being indicative of first player active times that the first player historically took turns while playing the turn based game, first player login times that the first player historically logged into the turn based game, first player turns taken that the first player historically took during first player historical sessions, and first player games started that the first player historically began during the first player historical sessions, the first player characteristics establishing a first player pattern and a first variance in the first player pattern including first outlier figures of at least one of the first player active times, the first player login times, the first player turns taken, and the first player games started, the first outlier figures being associated with respective timing conditions;
identifying a second player having second player characteristics of a second player activity, the second player characteristics being indicative of second player active times that the second player historically took turns while playing the turn based game, second player login times that the second player historically logged into the turn based game, second player turns taken that the second player historically took during second player historical sessions, and second player games started that the second player historically began during the second player historical sessions, the second player characteristics being compatible with the first player characteristics where at least one of the second player active times, the second player login times, the second player turns, and the second player games started substantially matches a corresponding one of the first outlier figures of the first player characteristics; and
generating an indication for a game server hosting the turn based game to match the second player with the first player.

16. The computer system of claim 15, wherein the method further comprises:
determining when the game server receives a request from the first player to initiate a new turn based game, the request indicating the game server is to match the first player with the second player; and
identifying the first player based on the request from the first player.

17. The computer system of claim 15, wherein the first player characteristics of the first player activity of the first player and the second player characteristics of the second player activity of the second player are determined from respective information included in a first player profile associated with the first player and a second player profile associated with the second player, respectively.

18. The computer system of claim 17, wherein the method further comprises:
monitoring the first player and the second player while playing the turn based game;
identifying activity events during a timeframe when the first and second players are playing the turn based game; and
recording the activity events in the first and second player profiles, respectively.

19. The computer system of claim 18, wherein the method further comprises:
normalize the first and second active times of the first and second players, respectively, based on the activity events.

20. The computer system of claim 18, wherein the activity events include a login time, a log out time, an active time period, a number of turns taken, a number of games started, a number of games played, a number of games completed, a number of games abandoned, a number of games abandoned due to time out, or a combination thereof.

* * * * *